United States Patent
Ma et al.

(10) Patent No.: US 11,397,340 B2
(45) Date of Patent: Jul. 26, 2022

(54) HEATING ELECTRODE FOR LOWERING STRESS OF LIGHT WAVEGUIDE AND VOA THEREOF

(71) Applicant: Accelink Technologies Co., Ltd., Wuhan (CN)

(72) Inventors: Weidong Ma, Wuhan (CN); Xiaohui Xu, Wuhan (CN); Ding Li, Wuhan (CN)

(73) Assignee: Accelink Technologies Co., Ltd.

( * ) Notice: Subject to any disclaimer, the term of this patent is extended or adjusted under 35 U.S.C. 154(b) by 403 days.

(21) Appl. No.: 16/461,956

(22) PCT Filed: Dec. 19, 2016

(86) PCT No.: PCT/CN2016/110662
§ 371 (c)(1),
(2) Date: Jul. 16, 2020

(87) PCT Pub. No.: WO2018/094793
PCT Pub. Date: May 31, 2018

(65) Prior Publication Data
US 2020/0348542 A1    Nov. 5, 2020

(30) Foreign Application Priority Data

Nov. 25, 2016 (CN) .......................... 201611055777.3

(51) Int. Cl.
*G02F 1/035* (2006.01)
*G02B 6/12* (2006.01)
(Continued)

(52) U.S. Cl.
CPC ........... *G02F 1/0147* (2013.01); *G02B 6/125* (2013.01); *G02F 1/0102* (2013.01)

(58) Field of Classification Search
CPC ...... G02F 1/0147; G02F 1/0102; G02B 6/125
(Continued)

(56) References Cited

U.S. PATENT DOCUMENTS

2004/0264836 A1* 12/2004 Kawashima ............ G02F 1/025
385/14
2013/0322809 A1* 12/2013 Goh .................... H04B 10/5053
385/3

FOREIGN PATENT DOCUMENTS

CN    103293714 A    9/2013
CN    103439806 A    12/2013
(Continued)

OTHER PUBLICATIONS

International Search report PCT/CN2016/110662, dated May 17, 2017.

*Primary Examiner* — Kaveh C Kianni
*Assistant Examiner* — Hung Q Lam
(74) *Attorney, Agent, or Firm* — Lerner, David, Littenberg, Krumholz & Mentlik, LLP

(57) ABSTRACT

A heating electrode for lowering stress of a light waveguide and a VOA. The heating electrode is provided on an upper cladding layer (04) of a PLC waveguide. The heating electrode is formed by combining two or more sub-heating electrodes (13) arranged at internals. Adjacent sub-heating electrodes (13) are connected by means of conductive electrodes (14) having a conductive function. By dividing a complete elongated heating electrode into a plurality of sub-heating electrodes (13), the stress exerted to a waveguide core layer is lowered without affecting the heating efficiency, and thus the reliability of optical indexes of a device is effectively improved.

8 Claims, 2 Drawing Sheets

(51) Int. Cl.
*G02F 1/01* (2006.01)
*G02B 6/125* (2006.01)

(58) Field of Classification Search
USPC ..... 385/3, 4, 8, 14, 37, 40, 45, 49, 129–132
See application file for complete search history.

(56) References Cited

FOREIGN PATENT DOCUMENTS

| | | |
|---|---|---|
| CN | 103760692 A | 4/2014 |
| CN | 104849878 A | 8/2015 |
| JP | 2008158411 A | 7/2008 |

\* cited by examiner

HEATING ELECTRODE FOR LOWERING STRESS OF LIGHT WAVEGUIDE AND VOA THEREOF

TECHNICAL FIELD

The present disclosure relates to an optical communication device, and in particularly, to a heating electrode for lowering stress of a light waveguide and a corresponding variable optical attenuator (VOA), and the present disclosure belongs to a technical field of optical communication device.

BACKGROUND

In the field of optical waveguide chips, such as VOA (Variable Optical Attenuator) based on MZI (Mach-Zehnder Interferometer) structure, OSW (Optical Switch), etc., it is necessary to achieve attenuation of optical power by a thermo-optic effect. Generally, a heating electrode is deposited on an upper cladding of a PLC waveguide, and the heating electrode generates heat by applying a voltage, and the heat is transferred to a waveguide core layer to realize a change in the effective refractive index of the waveguide core layer. Generally, as shown in FIG. 1, the heating electrode is an elongated metal plate with a certain thickness, however, since the thermal expansion coefficient of the metal is much larger than that of the silicon dioxide in the waveguide, when the temperature rises, the metal electrode will transmit the stress to the waveguide core layer, through the upper cladding, which renders changes in size and refractive index of the waveguide core layer, thus affecting optical indices of a chip device, such as attenuation accuracy, polarization dependent loss, and the like.

SUMMARY

In order to solve the above technical problems, the present disclosure provides a heating electrode for reducing stress influence of a light waveguide and a corresponding variable optical attenuator (VOA).

The technical solution of the present disclosure is as follows:

a heating electrode for lowering stress of a light waveguide, the heating electrode is provided on an upper cladding of a PLC waveguide, and the heating electrode is formed by combining two or more sub-heating electrodes arranged at intervals, and adjacent sub-heating electrodes are connected by a electrode having a conductive function.

The heating electrode adopts a metal or an alloy with a resistivity of 50-500 nΩ·m, and the conductive electrode adopts a metal or an alloy with a conductivity of 60-110% IACS.

The heating electrode uses one of titanium, tungsten, chromium, platinum or any combination thereof; the conductive electrode uses one of gold, copper, aluminum or any combination thereof.

The conductive electrode is formed by one conductive electrode or by connecting more than one conductive electrode.

The heating electrode satisfies the following conditions: $a1 \times A_1 = a2 \times L/2$, $a1 \times A_m = a2 \times L/2$, $L = A_1 + A_2 \ldots + A_m$, $B \geq 2A \times a1 \times \Delta T$, where L is a total length of the heating electrode, A is a sum of lengths of all sub-heating electrodes, m is a number of sub-heating electrodes, B is a length of each segment of the conductive electrode, a1 is a linear thermal expansion coefficient of a heating electrode material, a2 is a linear thermal expansion coefficient of a waveguide material, $A_1, A_2, \ldots, A_m$ are lengths of a first, second, ..., M-th sub-heating electrode, ΔT is a variation of temperature of the heating electrode.

An extent of expansion of the heating electrode is the same as that of a waveguide core layer.

A variable optical attenuator having a heating electrode for lowering stress of a light waveguide, uses a structure of a Mach-Zehnder Interferometer, and comprises an input light waveguide, an upper modulation light waveguide, a lower modulation light waveguide, and an output light waveguide, a heating electrode capable of lowering stress of the light waveguide is provided on the upper modulation light waveguide, and the heating electrode is formed by a series combination of two or more sub-heating electrodes arranged at intervals, and adjacent sub-heating electrodes are connected by a conductive electrode having a conductive function.

The sub-heating electrode employs titanium metal film having a linear thermal expansion coefficient of $8.2 \times 10^{-6}$/K.

Design of the heating electrode satisfies the following conditions: $a1 \times A_1 = a2 \times L/2$, $a1 \times A_m = a2 \times L/2$, $L = A_1 + A_2 \ldots + A_m$, $B \geq 2A \times a1 \times \Delta T$, where L is a total length of the heating electrode, A is a sum of the lengths of all sub-heating electrodes, m is a number of the sub-heating electrodes, B is a length of each segment of the conductive electrode, a1 is a linear thermal expansion coefficient of a heating electrode material, a2 is a linear thermal expansion coefficient of a waveguide material, $A_1, A_2, \ldots, A_m$ are lengths of a first, second, ..., M-th sub-heating electrode, ΔT is a variation of temperature of the heating electrode.

The length L of the heating electrode is 6 mm, the linear expansion coefficient a1 of the heating electrode material is $8.2 \times 10^{-6}$/K, and the linear expansion coefficient a2 of the waveguide material is $0.55 \times 10^{-6}$/K; the length of each segment of the conductive electrode B=0.001 mm, the number of the sub-heating electrodes m=14, the length of the sub-heating electrodes A1=A14=0.201 mm; the lengths of A2, A3, ..., A13 are 0.466 mm.

The advantages of the present invention are as follows:

By dividing a complete elongated heating electrode into a plurality of heating electrodes, the present disclosure reduces the stress influence applied to the waveguide core layer without affecting heating efficiency, thus the reliability of optical indices of a device is effectively improved.

REFERENCE SIGNS

| | |
|---|---|
| 10: Input light waveguide | 11: Upper modulation light waveguide |
| 12: Lower modulation light waveguide | 13: Sub-heating electrode |
| 14: conductive electrode | 15: Output light waveguide |

-continued

| 16: Upper cladding | 17: Waveguide core layer |
|---|---|
| 18: Lower cladding | 19: Substrate |

DESCRIPTION OF EMBODIMENTS

The technical solution of the present disclosure will be further described in detail with reference to the drawings.

The present disclosure provides a design method of a heating electrode for reducing stress of an optical waveguide, comprising the following steps:

1) Designing a heating electrode as several segments of sub-heating electrodes, and the length of each segment of the sub-heating electrode is A (mm).

2) Connecting adjacent sub-heating electrodes by a conductive electrode, and the length of each segment of the conductive electrode is B (mm).

The heating electrode of the present disclosure is provided on an upper cladding of a PLC waveguide, and the heating electrode is formed by combining two or more sub-heating electrodes separated from each other, and adjacent sub-heating electrodes are connected by a electrode having a conductive function; the heating electrode uses a metal or an alloy with a resistivity of 50-500 nΩ·m, and the conductive electrode uses a metal or an alloy with a conductivity of 60-110% IACS. The heating electrode is a metal such as titanium, tungsten, chromium or platinum and the like with a higher resistivity, or an alloy thereof; and the conductive electrode is a metal such as gold, copper or aluminum and the like with a higher conductivity, or an alloy thereof. Adjacent sub-heating electrodes are connected by one conductive electrode or several conductive electrodes. The total length of the heating electrode is L (mm), the length of the sub-heating electrode is A (mm), the number of the sub-heating electrodes is m, the length of each segment of the conductive electrode is B (mm). The optimal design of the heating electrode satisfies the following mathematical expressions:

$$a1 \times A_1 = a2 \times L/2$$

$$a1 \times A_m = a2 \times L/2$$

$$B \geq 2A \times a1 \times \Delta T$$

Where a1 is a linear thermal expansion coefficient of a heating electrode material, a2 is a linear thermal expansion coefficient of a waveguide material, $A_1, A_2, \ldots, A_m$ are lengths of a first, second, ..., M-th sub-heating electrode, $\Delta T$ is a variable quantity of temperature of the heating electrode.

Figure 1:
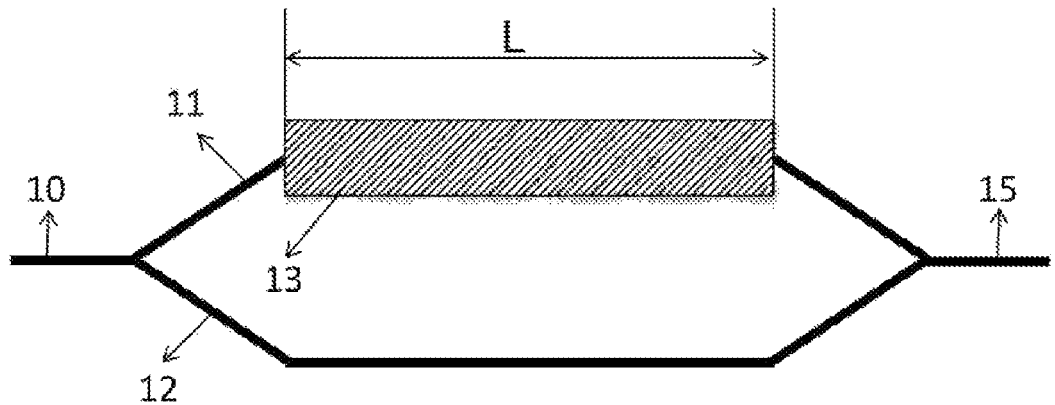
FIG. 1 is a schematic diagram showing a planar optical waveguide MZI type of VOA structure and a general electrode in the prior art.
Figure 2:
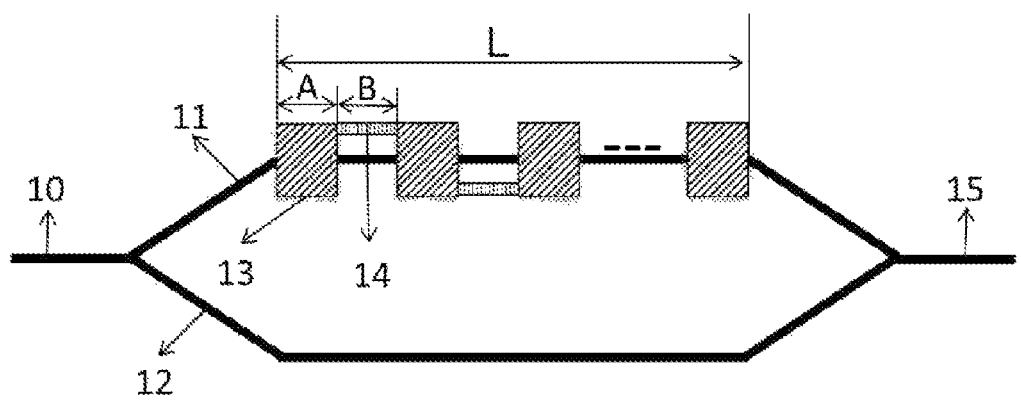
FIG. 2 is a schematic diagram showing a planar optical waveguide MZI type of VOA structure and an electrode according to an embodiment of the present disclosure.
Figure 3:
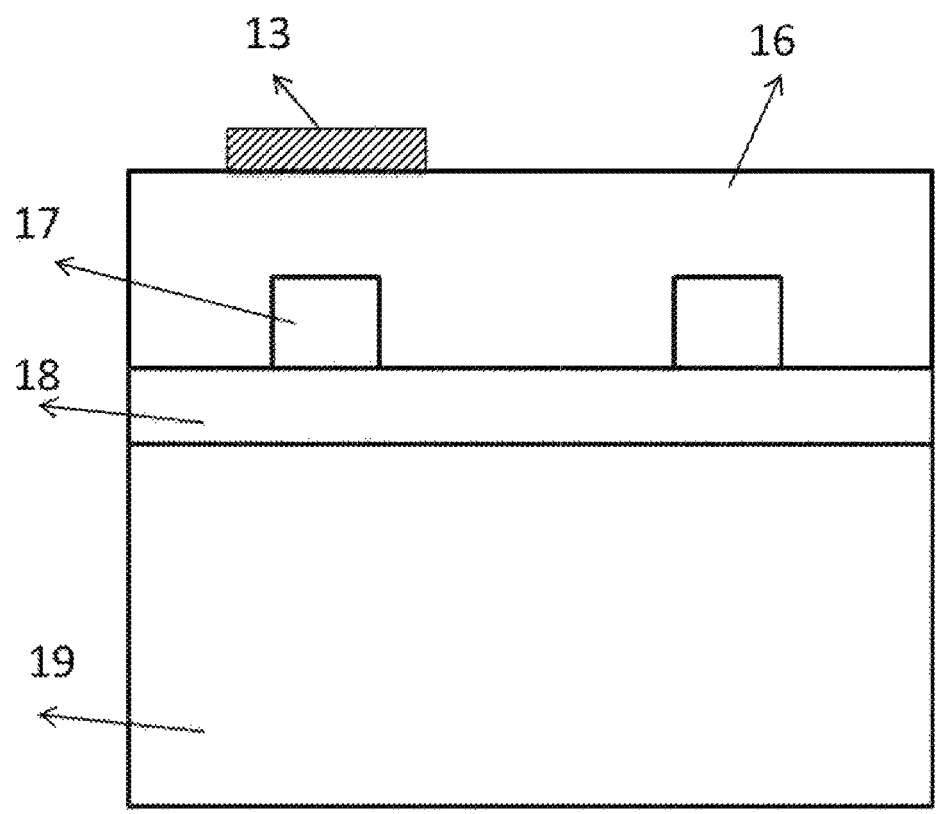
FIG. 3 is a cross-section view of the embodiment of FIG. 2.

In the present embodiment, a silica-on-silicon planar light waveguide MZI type of VOA is used, and the structure thereof is shown in FIG. 2 and FIG. 3. The present invention uses a Mach-Zehnder structure, including an input light waveguide 10, an upper modulation light waveguide 11, a lower modulation light waveguide 12, and an output light waveguide 15. A heating electrode is provided on the upper modulation light waveguide 11 and is formed by combining two or more sub-heating electrodes 13 separated from each other, and adjacent sub-heating electrodes are connected by a conductive electrode 14 which has a conductive function. The materials of each layer of silica-on-silicon planar optical waveguide MZI type of VOA in the present embodiment are as follows: a substrate 19 is a silicon-based wafer, a lower cladding 18 is silicon dioxide, a waveguide core layer 17 is germinium-doped silicon dioxide, the linear thermal expansion coefficient thereof is $0.55 \times 10^{-6}$/K, a upper cladding 16 is boron-phosphorus-doped silicon dioxide, a sub-heating electrode 13 is titanium metal film, and the linear thermal expansion coefficient thereof is $8.2 \times 10^{-6}$/K.

The optical path process of the silica-on-silicon planar optical waveguide MZI type of VOA embodiment of the present disclosure is as follows: the optical signal enters an attenuator from an input optical waveguide 10 and is then divided into an upper path and a lower path on average. The upper modulation light waveguide 11 is an regulation branch on which the heating electrode 13 is plated. By using the thermo-optic effect of silicon dioxide, the refractive index of waveguide material is changed by changing the temperature of the waveguide material, and a voltage is applied on the heating electrode 13 as needed to generate heat and the heat is transferred to the core layer 17 of the upper modulation light waveguide to realize temperature regulation, such that an optical signal from the upper modulation light waveguide interferes with that from the lower modulation light waveguide 12 at an output end 15 of the waveguide after regulated through a phase shift. The two original signals with the same phase and amplitude become two signals with the same amplitude and different phases after regulation, and the intensity of the two original signals changes after superposition, such that the attenuation of light signals is realized. When the phase difference between the upper branch signal and the lower branch signal is regulated to 180 degrees, the output signal intensity is 0, at this time, the attenuator may be used as an optical switch.

The design scheme of the heating electrode for reducing stress in the present embodiment is as follows: the length L of the general heating electrode is 6 mm, the linear expansion coefficient a1 of the heating electrode titanium is $8.2 \times 10^{-6}$/K, the linear expansion coefficient a2 of the waveguide core layer is $0.55 \times 10^{-6}$/K, and according to the expression $$A_1 = A_m = \frac{\alpha 2 \times L}{2 \alpha 1}$$

After calculation, A1=A14=0.201 mm; A2, A3, ..., A13 are 0.466 mm; m=14.

Generally, the temperature variation of the heating electrode of the silica-on-silicon planar optical waveguide MZI type of VOA under the working state does not exceed 80 degrees Celsius, and $\Delta T \leq 80$ is taken. The calculated result is as follows: $B \geq 0.611 \times 10^{-3}$ mm.

The design parameter of the heating electrode may take the following values: A1=A14=0.201 mm; A2, A3, ..., A13 are 0.466 mm; m=14, B=0.001 mm. At this time, under the working state, an extent of expansion of the heating electrode and that of the waveguide core layer is the same, at this time, the stress is the smallest and the optical indices are the most reliable.

In the present disclosure, a complete elongated heating electrode is designed as several segments of sub-heating electrodes. When the temperature changes, the heating electrode and the waveguide core layer maintain synchronous expansion and contraction and has the same extent of expansion and contraction. Compared with the conventional strip metal electrode, the stress applied to the waveguide core layer is greatly reduced, thus the reliability of optical indexes of a device is effectively improved.

The above are only the embodiments of the present disclosure, and are not intended to limit the scope of the present disclosure, any simple modification, equivalent change and modification to the above embodiment in accordance with the technical essence of the present disclosure are still within the scope of the technical solution of the present disclosure, therefore, the protection scope of the present disclosure should be subject to the protection scope of the claims.

What is claimed is:

1. A heating electrode for lowering stress of a light waveguide, characterized in that the heating electrode is provided on an upper cladding of a PLC waveguide, and the heating electrode is formed by combining two or more sub-heating electrodes arranged at intervals, and adjacent sub-heating electrodes are connected by a electrode having a conductive function,
wherein the heating electrode satisfies the following conditions: $a1 \times A_1 = a2 \times L/2$, $a1 \times A_m = a2 \times L/2$, $L = A_1 + A_2 \ldots + A_m$, $B \geq 2A \times a1 \times \Delta T$, where L is a total length of the heating electrode, A is a sum of lengths of all sub-heating electrodes, m is a number of the sub-heating electrodes, B is a length of each segment of the conductive electrode, a1 is a linear thermal expansion coefficient of heating electrode material, a2 is a linear thermal expansion coefficient of waveguide material, A1, A2, ..., Am are lengths of a first, second, ..., M-th sub-heating electrode, $\Delta T$ is a variation of temperature of the heating electrode, whereby the heating electrode and the waveguide core layer maintain synchronous expansion and contraction and has the same extent of expansion and contraction when the temperature changes.

2. The heating electrode for lowering stress of a light waveguide of claim 1, characterized in that the heating electrode employs a metal or an alloy with a resistivity of 50-500nΩ·m, and the conductive electrode employs a metal or an alloy with a conductivity of 60-110% IACS.

3. The heating electrode for lowering stress of a light waveguide of claim 2, characterized in that the heating electrode employs one of titanium, tungsten, chromium, platinum or any combination thereof; the conductive electrode employs one of gold, copper, aluminum or any combination thereof.

4. The heating electrode for lowering stress of a light waveguide of claim 1, characterized in that the conductive electrode is one conductive electrode or is formed by connecting more than one conductive electrode.

5. The heating electrode for lowering stress of a light waveguide of claim 1, characterized in that an extent of expansion of the heating electrode is the same as that of a waveguide core layer.

6. A variable optical attenuator (VOA) applying the heating electrode for lowering stress of a light waveguide of claim 1, adopts a structure of a Mach-Zehnder Interferometer, comprising an input light waveguide (10), an upper modulation light waveguide (11), a lower modulation light waveguide (12), and an output light waveguide (15), characterized in that the heating electrode capable of lowering stress of the light waveguide is provided on the upper modulation light waveguide (11), and is formed by a series combination of two or more sub-heating electrodes (13) arranged at intervals, and adjacent sub-heating electrodes are connected by a conductive electrode (14) having a conductive function.

7. The VOA of claim 6, characterized in that the sub-heating electrode (13) employs titanium metal film having a linear thermal expansion coefficient of $8.2 \times 10^{-6}$/K.

8. The VOA of claim 6, characterized in that the length L of the heating electrode is 6 mm, the linear expansion coefficient a1 of the heating electrode material is $8.2 \times 10^{-6}$/K, and the linear expansion coefficient a2 of the waveguide material is $0.55 \times 10^{-6}$/K; the length of each segment of conductive electrode B=0.001 mm, the number of sub-heating electrodes m=14, and the length of sub-heating electrodes A1=A14=0.201 mm; the lengths of A2, A3, ..., A13 are 0.466 mm.

* * * * *